United States Patent
Li et al.

(10) Patent No.: US 12,010,164 B2
(45) Date of Patent: Jun. 11, 2024

(54) SYSTEM FOR PROVIDING EXACT COMMUNICATION DELAY GUARANTEE OF REQUEST RESPONSE FOR DISTRIBUTED SERVICE

(71) Applicants: INSTITUTE OF ACOUSTICS, CHINESE ACADEMY OF SCIENCES, Beijing (CN); BEIJING HILI TECHNOLOGY CO. LTD, Beijing (CN)

(72) Inventors: Yanxia Li, Beijing (CN); Jinlin Wang, Beijing (CN); Peng Sun, Beijing (CN); Jiaqi Li, Beijing (CN)

(73) Assignees: INSTITUTE OF ACOUSTICS, CHINESE ACADEMY OF SCIENCES, Beijing (CN); BEIJING HILI TECHNOLOGY CO. LTD, Beijing (CN)

( * ) Notice: Subject to any disclaimer, the term of this patent is extended or adjusted under 35 U.S.C. 154(b) by 0 days.

(21) Appl. No.: 17/760,889

(22) PCT Filed: Sep. 26, 2019

(86) PCT No.: PCT/CN2019/108081
§ 371 (c)(1),
(2) Date: Mar. 16, 2022

(87) PCT Pub. No.: WO2021/056314
PCT Pub. Date: Apr. 1, 2021

(65) Prior Publication Data
US 2022/0353320 A1 Nov. 3, 2022

(30) Foreign Application Priority Data
Sep. 23, 2019 (CN) .......................... 201910897838.8

(51) Int. Cl.
*G06F 15/16* (2006.01)
*H04L 67/10* (2022.01)
*H04L 67/56* (2022.01)

(52) U.S. Cl.
CPC .............. *H04L 67/10* (2013.01); *H04L 67/56* (2022.05)

(58) Field of Classification Search
CPC ...... H04L 67/10; H04L 67/56; H04L 67/1008; H04L 67/1021; H04L 67/1097;
(Continued)

(56) References Cited

U.S. PATENT DOCUMENTS

| 11,552,785 B2 * | 1/2023 | Stephenson | H04L 9/0643 |
| 2002/0107040 A1 * | 8/2002 | Crandall | H04L 43/045 |
| | | | 455/67.11 |

(Continued)

FOREIGN PATENT DOCUMENTS

| CN | 101345628 A | 1/2009 |
| CN | 101883124 A | 11/2010 |

(Continued)

OTHER PUBLICATIONS

Aug. 4, 2021 Office Action and Search Report issued in Chinese Patent Application No. 201910897838.8.
(Continued)

*Primary Examiner* — Yves Dalencourt
(74) *Attorney, Agent, or Firm* — Oliff PLC

(57) ABSTRACT

A system for providing exact communication delay guarantee of a request response for a distributed service, includes: a plurality of service provider nodes, a management node, and a plurality of proxy nodes; a set of users served by each service provider node constitutes a coverage area of the node; a communication delay between any user in the coverage area and the service provider node is less than a
(Continued)

predetermined delay guarantee value; a physical network enables, according to division of the coverage areas of the service provider nodes, each user in the network to be located in a coverage area, and each user is served by at least one service provider node; and the coverage area includes a plurality of adjacent areas, and each service provider node has a plurality of adjacent nodes. In the system, each user can complete service request and response within a determined communication delay range.

14 Claims, 1 Drawing Sheet

(58) Field of Classification Search
CPC ......... H04L 67/52; H04L 67/60; H04L 67/62; H04L 67/1001; H04L 65/1045
See application file for complete search history.

(56) References Cited

U.S. PATENT DOCUMENTS

| | | | | |
|---|---|---|---|---|
| 2008/0189429 A1* | 8/2008 | DaCosta | ................ | H04L 65/80 709/231 |
| 2009/0047948 A1* | 2/2009 | Turetsky | ............... | H04W 48/20 455/432.1 |
| 2010/0238802 A1* | 9/2010 | Lei | ..................... | H04L 41/5019 370/230.1 |
| 2010/0278046 A1 | 11/2010 | Mateos Perez et al. | | |
| 2012/0110462 A1* | 5/2012 | Eswaran | ............ | H04L 12/1439 709/224 |
| 2013/0114504 A1* | 5/2013 | Zhao | .................... | H04W 48/18 370/328 |
| 2013/0166654 A1 | 6/2013 | Hjelm et al. | | |
| 2014/0006951 A1* | 1/2014 | Hunter | ............... | H04N 21/4821 715/719 |
| 2014/0038654 A1* | 2/2014 | Ahmadi | ................ | G06F 9/5027 455/517 |
| 2015/0052247 A1* | 2/2015 | Threefoot | ............... | H04L 67/10 709/225 |
| 2015/0304984 A1* | 10/2015 | Khemani | ............... | H04W 16/18 455/456.1 |
| 2017/0004548 A1* | 1/2017 | Goel | .................. | G06Q 30/0282 |
| 2018/0026938 A1* | 1/2018 | Xiang | ................... | H04L 67/289 709/245 |
| 2018/0160418 A1* | 6/2018 | Luo | ........................ | H04W 72/23 |
| 2018/0241802 A1* | 8/2018 | Bernat | ................ | H04L 43/0894 |
| 2022/0353320 A1* | 11/2022 | Li | ........................... | H04L 67/10 |

FOREIGN PATENT DOCUMENTS

| | | | | |
|---|---|---|---|---|
| CN | 101969396 A | | 2/2011 | |
| CN | 102546226 A | | 7/2012 | |
| CN | 103298053 A | | 9/2013 | |
| CN | 104734991 A | * | 6/2015 | |
| CN | 107645525 A | | 1/2018 | |
| EP | 2301635 A1 | * | 3/2011 | ............. A63F 13/12 |
| WO | WO-2016137496 A1 | * | 9/2016 | |

OTHER PUBLICATIONS

Dec. 23, 2021 Office Action issued in Chinese Patent Application No. 201910897838.8.

Jun. 23, 2020 International Search Report issued in International Patent Application No. PCT/CN2019/108081.

* cited by examiner

SYSTEM FOR PROVIDING EXACT COMMUNICATION DELAY GUARANTEE OF REQUEST RESPONSE FOR DISTRIBUTED SERVICE

RELATED APPLICATIONS

The present application claims the priority of the Chinese patent application No. 201910897838.8, filed on Sep. 23, 2019 and entitled "System for Providing Exact Communication Delay guarantee of Request Response for Distributed Service", which is incorporated herein by reference.

TECHNICAL FIELD

The present invention relates to a distributed service system, in particular to a system for providing exact communication delay guarantee of a request response for a distributed service.

BACKGROUND ART

During the development of the Internet, a single server or client model was initially used to provide service to a user. Along with the development of processor level and clustering technology, the service processing time of a centralized service model has been significantly shortened, however, the problem of untimely service brought by long-distance communication under this model has become increasingly prominent. The essence of the problem lies in that service delay includes such two parts as service processing delay and service message transmission delay, wherein the service processing delay may be possibly minimized by enhancing the capacity of a single machine hardware or horizontal expansion, while the service message transmission delay may be several orders of magnitude higher than the service processing delay since the service message transmission delay is limited by the existing transport layer technology and objective transmission distance. To this end, more and more distributed service systems have emerged. In these distributed service systems, a plurality of servers are deployed in the network in a decentralized manner, and the user chooses a nearest server to provide service for himself, thereby shortening the transmission delay of a service message and greatly shortening the average service delay of a system. However, an existing distributed service system may only ensure the best effort to provide the nearest service, and may not know a return delay of the request in advance before the request occurs. In some delay-sensitive business scenarios, such as Telematics or Industrial IoT, an upper-layer business has strict requirements on the response delay of the service, which requires the service system to return within a certain delay, instead of doing its best to return as soon as possible.

Since the service delay includes both service processing delay and service message transmission delay, the service message transmission delay is several orders of magnitude higher than the service processing delay in many scenarios and becomes a decisive factor in service delay.

SUMMARY OF THE INVENTION

The objective of the present invention is to overcome the above technical shortcomings and propose a new distributed service system with delay guarantee characteristics in a distributed service scenario with strict requirements for service response delay, to provide request/response exact communication delay guarantee for all the users in a network.

To achieve the above objective, embodiment 1 of the present invention provides a system for providing exact communication delay guarantee of a request response for a distributed service, wherein the system includes a plurality of service provider nodes, a management node, and a plurality of proxy nodes; a set of users served by each service provider node constitutes a coverage area of the service provider node, and a communication delay between any user in the coverage area and the service provider node is less than a predetermined delay guarantee value; a physical network enables, according to division of the coverage areas of the service provider nodes, each user in the network to be located in a coverage area, and each user is served by at least one service provider node; and the coverage area includes a plurality of adjacent areas, and each service provider node has a plurality of neighbor nodes;

each service provider node saves its neighbor node information, and reports its information to a management node;

the management node is configured to receive and store information reported by all the service provider nodes, to respond to the request for obtaining a service provider node list from the proxy node or the user, wherein request parameters carry information of the proxy node or the user himself; the information of the proxy node or the user is matched with the service provider node information stored in the management node, to form a recommended service provider node list and return to the proxy node or the user; and the proxy node is deployed at a position of a user network access point, and is configured to acquire a service request message sent by the user, and is configured to request the service provider node list from the management node, acquire the recommended service provider node list returned by the management node, select and save service provider nodes which may provide delay guarantee for themselves in the list, and acquire a service response message and forward to the user who sends the service request message.

As an improvement of the above system, the neighbor node information includes a network address, geographical coordinates and a node service ability; the information reported by each service provider node to the management node includes: the network address, the geographical coordinates and the node service ability; and the request parameters carry the network address, the geographical coordinates and the required service ability included in the information of the proxy node or the user himself.

As an improvement of the above system, the manner in which the information of the proxy node or the user is matched with the service provider node information stored in the management node includes: one or more of IP segment matching, geographical position coordinate matching and service ability matching.

As an improvement of the above system, the manner in which the proxy node acquires the service request message sent by the user includes: directly obtaining the service request message directly sent to the proxy node by the user, or obtaining the service request message sent to the service provider node by the user through capturing.

As an improvement of the above system, the manner in which the proxy node obtains the service response message is as follows:

acquiring the corresponding service response message through a manner of forwarding the service request message to the service provider node saved by the proxy node; or acquiring the corresponding service response message through local resources, wherein the local resources refer to local cache information; and wherein when the number of service provider nodes saved by the proxy node is greater than 1, according to the characteristic of the service provider nodes themselves, an optimal service provider node is selected to send the service request message, and the characteristic of the service provider nodes themselves includes: hardware ability and local structure of the node.

Embodiment 2 of the present invention provides a method for acquiring exact communication delay guarantee service, which is implemented based on the above system, wherein the method includes:

selecting an optimal service provider node from the saved service provider node list capable of providing exact communication delay guarantee;

sending the service request message; and receiving the service response message.

As an improvement of the above method, the method further includes:

directly configuring a service provider node address;

requesting neighbor node information from the service provider node; and screening and saving the service provider nodes that can provide delay guarantee for themselves in the service provider node and its neighbor nodes.

As an improvement of the above method, the method further includes:

acquiring a corresponding proxy node according to an existing network mechanism;

requesting from the proxy node the service provider node list saved by the proxy node; and screening and saving the service provider nodes capable of providing delay guarantee for themselves in the service provider node list.

As an improvement of the above method, the method further includes:

requesting the recommended service provider node list from the management node; and screening and saving the service provider nodes capable of providing delay guarantee for themselves in the service provider node list.

As an improvement of the above method, when the number of saved service provider nodes in the service provider node list capable of providing exact communication delay guarantee is greater than 1, according to the characteristic of the service provider nodes themselves, an optimal service provider node is selected from the service provider node list, and the characteristic of the service provider nodes themselves includes: hardware ability and local structure of the node.

As an improvement of the above method, the manner of sending the service request message to the service provider node is as follows: directly sending the service request message to the optimal service provider node, or sending the service request message to the proxy node.

As an improvement of the above method, the manner of receiving the service response message is as follows: directly receiving the service response message returned by the service provider node, or receiving the service response message forwarded by the proxy node.

Embodiment 3 of the present invention provides a device for acquiring exact communication delay guarantee service, wherein the device includes:

a service provider node acquisition module, configured to select an optimal service provider node from a saved service provider node list which may provide exact communication delay guarantee;

a service request message sending module, configured to send the service request message; and a service response message receiving module, configured to receive the service response message.

Embodiment 4 of the present invention provides a terminal device, including a memory, a processor and a computer program stored on the memory and capable of running on the processor, wherein the processor implements the above method when executing the computer program.

The present invention has the following beneficial effects:
1. In the distributed service system of the present invention, each user may finish service request and response within a determined communication delay range;
2. In the method for acquiring exact communication delay guarantee service of the present invention, the user may select multiple access manners to access a distributed service system according to his own characteristic;
3. In the method for acquiring exact communication delay guarantee service of the present invention, the user may be served by choosing to use proxy or use no proxy.

DETAILED DESCRIPTION OF THE EMBODIMENTS

Technical solutions of the present invention will be described in details below in combination with accompanying drawings and specific embodiments.

Embodiment 1

The present invention provides a system for providing exact communication delay guarantee of a request response for a distributed service, and the system includes a plurality of service provider nodes distributed in the service area, a management node and a plurality of proxy nodes deployed at the user network access position. Wherein the service provider node is provided with a pre-deployed system service program, to provide these deployed services for users within the node service area; a set of users served by each service provider node constitutes a coverage area of the service provider node, and a communication delay between any user in the coverage area and the service provider node is less than a predetermined delay guarantee value; a physical network enables, according to division of the coverage areas of the service provider nodes, each user in the network to be located in a certain coverage area, and each user is served by at least one service provider node; according to a network connection relationship, each coverage area includes a plurality of adjacent areas, and each corresponding service provider node has a plurality of neighbor nodes; the management node saves information of all the service provider nodes, and responds to a list acquisition request of the proxy node or the service provider node of the user through a manner of information matching; the proxy node is deployed at the position of the network access point, selects a proper service provider node from the service provider node list acquired from the management node and saves the proper service provider node, and may respond to the acquisition request of the service provider node of the user, and may forward the service request to the service provider node on behalf of the user or directly respond to the service request of the user; the user requests the above deployed service from the service provider node in his coverage area; a proper service provider node may be selected in such three manners as manually configuring by a network administrator, acquiring the service provider node from the proxy node or acquiring the service provider node from a management system to provide service for the user, and the distributed service may be used through such two manners as sending a service request to the service provider node or sending a service request to the proxy node. Through the above system, the request/response communication delay may be ensured to be within a certain exact delay value when the distributed service is provided to the user in the network.

Figure 1:
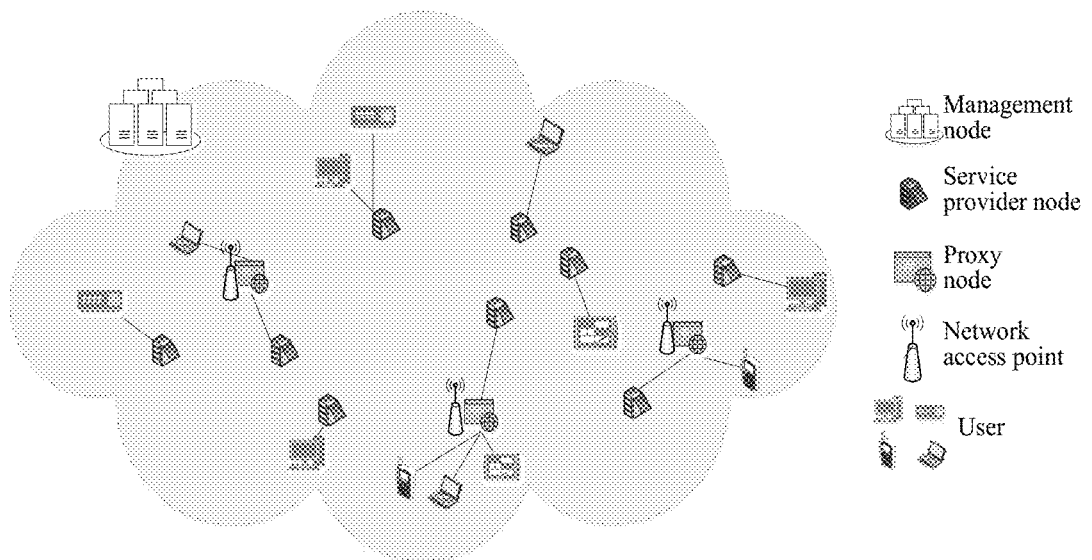
FIG. 1 is a schematic diagram of a system for providing exact communication delay guarantee of a request response for a distributed service of the present invention.
Figure 2:
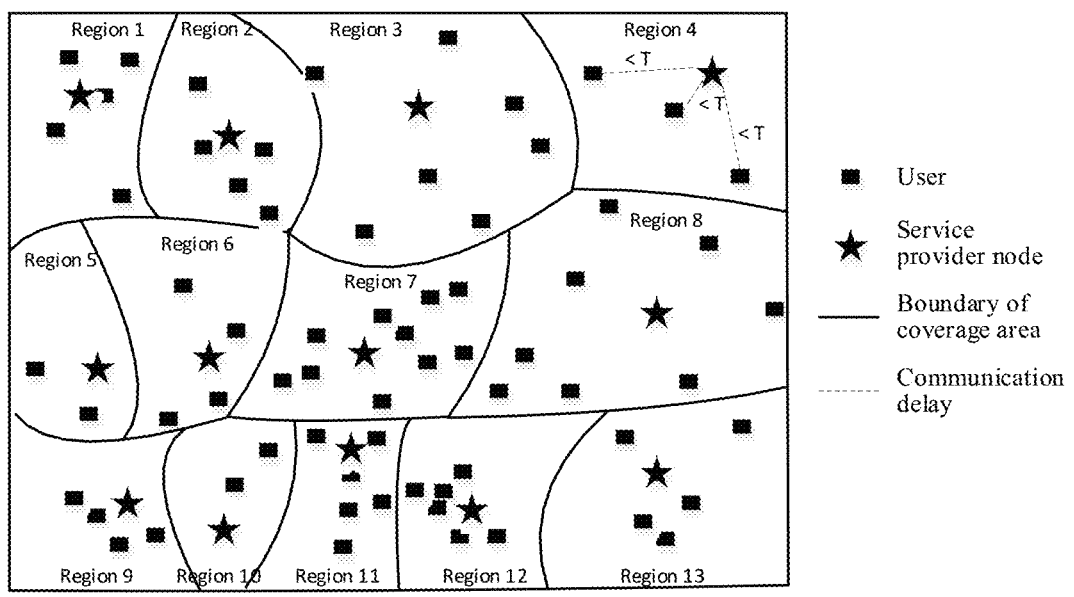
FIG. 2 is a schematic diagram of a service coverage area of the service provider node to the user.

As shown in FIG. 1, embodiment 1 of the present invention provides a system for providing exact communication delay guarantee of a request response for a distributed service, and the system includes a plurality of service provider nodes distributed in the service area, a management node and a plurality of proxy nodes deployed at the network access position of the user; wherein the service provider nodes, the management node and the proxy nodes may be servers;

the service provider node is provided with a pre-deployed system service program, to provide these deployed services for the user in the node service area; a set of users served by each service provider node constitutes a coverage area of the service provider node, and a communication delay between any user in the coverage area and the service provider node is less than a predetermined exact delay; a physical network enables, according to division of the coverage areas of the service provider nodes, each user in the network to be located in a certain coverage area, and each user is served by at least one service provider node; according to the network connection relationship, each coverage area includes a plurality of adjacent areas, and each corresponding service provider node has a plurality of neighbor nodes; and the service coverage area of the service provider node to the user is as shown in FIG. 2.

Each service provider node saves neighbor node information, and the neighbor node information may include, but is not limited to, the network address, geographic coordinates, and the node service ability, etc.;

each service provider node reports its own information to the management node, and the reported information may include, but is not limited to, the network address, geographic coordinates, and the node service ability, etc.

Wherein, the network is composed of network devices and communication lines between the devices; at least one pair of network devices are directly connected through communication lines in two network areas which are adjacent to each other.

The management node is responsible for storing the information reported by all the service provider nodes, and the management node responds to a list acquisition request of the proxy node or the service provider node of the user, wherein the information carried in the request parameters includes but is not limited to the network address of the proxy node or the user, the geographical coordinates and the required service ability, etc.; the management node matches the information of the proxy node or the user with the service provider node information stored in the management node, and returns the recommended service provider node list to the proxy node or the user; and the matching manner includes but is not limited to IP segment matching, geographical position coordinate matching and service ability matching.

The proxy node is deployed at the position of the user network access point, and may respond to the acquisition request of the service provider node of the user, and may also acquire and respond to the service request of the user, wherein, the deployment manner of the proxy node in the network access point device includes: deployment of the proxy node program, and deployment to a forwarder of the proxy node, etc.

The user may acquire the address of the proxy node deployed on the network access point through the existing network mechanism, the existing network mechanism may include but is not limited to acquiring a current gateway address command, etc.; the proxy node requests a service provider node list from the management node, and selects and saves a proper service provider node in the list, wherein considerations in the selection process may include but are not limited to the communication delay value from the proxy node to the service provider node, the characteristic of each service provider node itself (including, but not limited to, hardware ability, local structural characteristics, etc.). The proxy node responds to the acquisition request of the service provider node of the user, and returns the service provider node information saved by the proxy node; the proxy node may obtain the service request message directly sent by the user to the proxy node, or may obtain the service request message sent by the user to the service provider node through capturing, and the proxy node returns to the user the service response message corresponding to the service request message;

the proxy node may obtain the corresponding service response message through forwarding the service request message to the service provider node saved by the proxy node, or the proxy node may obtain the corresponding service response message through local resources, the local resources refer to local cache information.

The proxy node is deployed at the position of the network access point, and the communication message from the user to the service provider node must pass through the network access point. The proxy node selects the proper service provider node from the service provider node list acquired by the management node and saves the proper service provider node, and may respond to the acquisition request of the service provider node of the user, and may also acquire and respond to the service request of the user.

The proxy node acquires the service provider nodes from the management node in the following steps:

1. The proxy node requests the recommended service provider node list from the management node, the request parameters carry their own information, and the information may include but is not limited to the network address and geographical coordinates;
2. The proxy node screens the service provider nodes capable of providing delay guarantee for themselves in the service provider node list.

The proxy node may acquire the user service request message through the following two manners:
1. The proxy node receives the service request message sent to the proxy node by the user; and
2. the proxy node captures the service request message sent to the service provider node by the user, and the capturing manner includes but is not limited to deploying a monitoring module at the network access point.

The proxy node may obtain the service response message corresponding to the service request message through the following two manners:
1. The proxy node forwards the message to the service provider node saved by the proxy node, and receives the service response message;
wherein when the number of the service provider nodes saved by the proxy node is greater than 1, according to the characteristic value of the service provider nodes themselves, an optimal service provider node is selected to send the service request message, and the characteristic of the service provider nodes themselves includes: hardware ability and local structure of the node.
2. The proxy node obtains the service response message corresponding to the service request message through local resources, and the local resources may include but are not limited to local cache information, etc.

The proxy node requests the service provider node list from the management node, the request parameters carry their own information, and the information may include but is not limited to the network address and geographical coordinates;
the manner in which the proxy node captures the service request message sent to the service provider node by the user includes but is not limited to deploying a monitoring module at the network access point.

The proxy node acquires the service provider node in the following steps:
step 101) sending, by the proxy node, its own information to the management node, and requesting a recommended service provider node list, and
step 102) screening, by the proxy node, the service provider nodes capable of providing delay guarantee for themselves in the recommended service provider node list.

Embodiment 2

Based on the above system, embodiment 2 of the present invention further provides a method for acquiring exact communication delay guarantee service, and the method includes:
step S1) selecting an optimal service provider node from the saved service provider node list capable of providing exact communication delay guarantee;
the service provider node list capable of providing exact communication delay guarantee may be saved through the following three manners:
the following steps are included when the user accesses a distributed network through manual configuring by a network administrator:
step 201) manually configuring, by the network administrator, a service provider node address for the user;
step 202) requesting, by the user, its neighbor node address from the service provider node; and step 203) screening, by the user, the service provider nodes capable of providing delay guarantee for themselves in the service provider nodes and their neighbor nodes.

The following steps are included when the user accesses the distributed network through an access proxy:
step 301) acquiring, by the user, the corresponding proxy node address through the existing network mechanism;
step 302) requesting, by the user, the corresponding service provider node address from the proxy node; and
step 303) screening, by the user, the service provider nodes capable of providing delay guarantee for themselves in the service provider node list.
when the user accesses the distributed network through the management node, the following step is included:
the user requests the service provider node list from the management node, wherein the request parameters carry their own information, and the information may include but is not limited to the network address, geographical coordinates, etc.
step 401) requesting, by the user, the recommended service provider node address list;
step 402) screening, by the user, the service provider nodes capable of providing delay guarantee for themselves in the service provider node list.

When the number of saved service provider nodes is greater than 1, according to the characteristic of the service provider nodes themselves, an optimal service provider node is selected to send the service request message, and the characteristic of the service provider nodes themselves includes: hardware ability and local structure of the node.
Step S2) sending the service request message;
the user may send the service request message to the optimal service provider node; or send the service request to the proxy node;
step S3) receiving the service response message.

The service response message may be returned by the service provider node, or the corresponding service response message may be returned by the proxy node.

The distributed network provides service based on request/response manner to the user through service programs deployed in the service provider nodes, and the specific service may include but is not limited to database service, web search and other services.

The communication delay includes service request communication delay and service response communication delay;
when the user request is directly sent to the service provider node and the service response message is returned directly by the service provider node, the service request communication delay refers to the transmission delay from the sending of the service request message by the user to the reception by the service provider node, and the service response communication delay refers to the transmission delay from the sending of the service response message by the service provider node to the reception by the user;
when the user request is obtained by the proxy node and the proxy node returns the service response message to the user according to local resources, the service request communication delay refers to the transmission delay from the sending of the service request message by the user to the reception by the proxy node, and the service response communication delay refers to the transmission delay from the sending of the service response message by the proxy node to the reception by the user;
when the user request is obtained by the proxy node, the proxy node forwards the service request message to the service provider node saved by the proxy node, and replies the message returned by the service provider node to the user, the service request communication delay refers to the sum of the transmission delay from the sending of the service request message by the user to the reception by the proxy node and the transmission delay from the sending of the service request message by the proxy node to the reception by the service provider node, and the service response communication delay refers to the sum of the transmission delay from the sending of the service response message by the service provider node to the reception by the proxy node and the transmission delay from the sending of the service response message by the proxy node to the reception by the user; and the exact communication delay guarantee means that the communication delay is always lower than a certain fixed delay value.

Embodiment 3

Embodiment 3 of the present invention provides a device for acquiring exact communication delay guarantee service, wherein the device includes:

a service provider node acquisition module, configured to select an optimal service provider node from a saved service provider node list which may provide exact communication delay guarantee;

a service request message sending module, configured to send the service request message; and a service response message receiving module, configured to receive the service response message.

Embodiment 4

Embodiment 4 of the present invention provides a terminal device, including a memory, a processor and a computer program stored on the memory and capable of running on the processor, wherein the processor implements the method of the claims and embodiment 2 when executing the computer program. The terminal device may be a computer device or a mobile terminal; and the mobile terminal includes: a mobile phone, a tablet computer and a wearable device, etc.

In several embodiments provided in the present application, it should be understood that the disclosed device and method may also be implemented in other ways. The device embodiment described above is merely schematic, for example, the flowcharts and block diagrams in the accompanying drawings show the possibly implemented architecture, function, and operation of the device, method, and computer program products according to several embodiments of the present invention. In this regard, each box in a flowchart or block diagram may represent a module, a program segment or part of a code, and the module, the program segment or part of the code contains one or more executable instructions for implementing a prescribed logical function. It should also be noted that, in some execution modes as replacements, the functions indicated in the boxes may also occur in a different order than that indicated in the accompanying drawings. For example, two consecutive boxes may actually be executed substantially in parallel, and they may sometimes be executed in an opposite order, depending on the functions involved. It should also be noted that, each box in the block diagram and/or the flowchart and the combination of boxes in the block diagram and/or flowchart may be implemented with a dedicated hardware-based system that performs a specified function or action, or may be implemented with a combination of dedicated hardware and computer instructions.

Alternatively, each function module in each embodiment of the present invention may be integrated together to form a separate part, or each module may exist separately, or two or more modules may be integrated to form a separate part.

When the function is implemented in the form of a software function module and sold or used as a stand-alone product, the function may be stored in a computer readable storage medium. Based on this understanding, the technical solution of the present invention, or the part of the technical solution that essentially contributes to the prior art, or part of the technical solution may be embodied in the form of a software product, the computer software product is stored in a storage medium, and includes a number of instructions to enable a computer device (which may be a personal computer, a server, or a network device, etc.) to perform all or part of the steps of the method described in various embodiments of the present invention. The aforementioned storage media include: USB flash drives, mobile hard drives, read-only memories (ROMs), random access memories (RAMs), disks, or CD-ROMs, and other media that may store program codes.

Finally, it should be noted that the above embodiments are merely used to illustrate, rather than limiting, technical solutions of the present invention. Although the present invention is described in detail with reference to the embodiments, those skilled in the art should understand that, any modification or equivalent substitution made to the technical solution of the present invention does not depart from the spirit and scope of the technical solutions of the present invention, and shall all fall within the scope of the claims of the present invention.

The invention claimed is:

1. A system for providing exact communication delay guarantee of a request response for a distributed service, the system comprising:

a plurality of service provider nodes, a coverage area of each service provider node serving a set of users, communication between any user in the coverage area and a corresponding service provider node being subject to a communication delay, each coverage area having a plurality of adjacent areas, and each service provider node having a plurality of neighbor nodes and saving neighbor node information on the plurality of neighbor nodes;

a physical network that enables, according to division of the coverage areas of the service provider nodes, each user in the physical network to be located in one of the coverage areas;

at least one proxy node deployed at a position of a user network access point, and configured to:
  acquire a service request message sent by one of the users;
  request a service provider node list having request parameters that carry information of the at least one proxy node or the one user;
  acquire a recommended service provider node list;
  screen service provider nodes in the recommended service provider node list that provide a delay guarantee such that the communication delay with the one user will be less than a predetermined delay guarantee value;
  select and save the service provider nodes which provide the delay guarantee in the recommended service provider node list; and acquire and forward a service response message to the one user; and a management node configured to:
receive and store service provider node information reported by all the service provider nodes, including the neighbor node information;
respond to the request for obtaining the service provider node list from the at least one proxy node or the one user, the information of the at least one proxy node or the one user being matched with the service provider node information stored in the management node; and
form and return the recommended service provider node list to the proxy node or the one user.

2. The system according to claim 1, wherein the neighbor node information comprises a network address, geographical coordinates and a node service ability; and the request parameters include the network address, the geographical coordinates and a required service ability of the at least one proxy node or the one user.

3. The system according to claim 2, wherein the information of the at least one proxy node or the one user is matched with the service provider node information stored in the management node by one or more of: Internet Protocol (IP) segment matching; geographical position coordinate matching; and service ability matching.

4. The system according to claim 3, wherein the at least one proxy node acquires the service request message sent by the one user by: directly obtaining the service request message directly sent to the at least one proxy node by the one user, or obtaining the service request message sent to a service provider node by the one user through capturing.

5. The system according to claim 4, wherein the at least one proxy node obtains the service response message by:
acquiring a corresponding service response message by forwarding the service request message to the service provider node saved by the at least one proxy node; or
acquiring the corresponding service response message through local resources referring to local cache information; and
wherein when a number of service provider nodes saved by the at least one proxy node is greater than 1, an optimal service provider node is selected to send the service request message according to hardware ability and local structure of the service provider nodes.

6. A method for acquiring exact communication delay guarantee service, the method comprising:
providing the system of claim 1;
selecting an optimal service provider node from a saved service provider node list capable of providing exact communication delay guarantee;
sending the service request message using the optimal service provider node; and
receiving the service response message using the at least one proxy node.

7. The method according to claim 6, further comprising:
directly configuring a service provider node address;
requesting neighbor node information from the service provider nodes; and
identifying and saving each service provider node of the service provider nodes that can provide delay guarantee in the service provider node and neighbor nodes of the service provider node.

8. The method according to claim 6, further comprising:
acquiring a corresponding proxy node according to an existing network mechanism;
requesting from the corresponding proxy node the service provider node list saved by the corresponding proxy node; and
screening and saving the service provider nodes capable of providing delay guarantee in the service provider node list.

9. The method according to claim 6, further comprising:
requesting the recommended service provider node list from the management node; and
screening and saving the service provider nodes capable of providing delay guarantee in the service provider node list.

10. The method according to claim 6, wherein when a number of saved service provider nodes in the service provider node list capable of providing exact communication delay guarantee is greater than 1, an optimal service provider node is selected from the service provider node list according to hardware ability and local structure of the service provider nodes.

11. The method according to claim 6, wherein sending the service request message includes: directly sending the service request message to the optimal service provider node, or sending the service request message to the at least one proxy node.

12. The method according to claim 11, wherein receiving the service response message includes: directly receiving the service response message returned by the service provider node, or receiving the service response message forwarded by the at least one proxy node.

13. A device for acquiring exact communication delay guarantee service, the device comprising:
a service provider node acquisition module, configured to select an optimal service provider node from a saved service provider node list which provides exact communication delay guarantee;
a service request message sending module, configured to send a service request message; and
a service response message receiving module, configured to receive a service response message.

14. A terminal device comprising:
a processor; and
a memory connected to the processor and storing a computer program causing the processor to implement the method of claim 6.

* * * * *